US009411879B2

(12) United States Patent
Ritchey et al.

(10) Patent No.: US 9,411,879 B2
(45) Date of Patent: Aug. 9, 2016

(54) SYSTEMS, METHODS, AND INTERFACES FOR AGGREGATING AND PROVIDING INFORMATION REGARDING LEGAL PROFESSIONALS

(75) Inventors: Kevin L. Ritchey, St Paul, MN (US); Charles Vanek, Minneapolis, MN (US)

(73) Assignee: Thomson Reuters Global Resources, Baar (CH)

( * ) Notice: Subject to any disclaimer, the term of this patent is extended or adjusted under 35 U.S.C. 154(b) by 1078 days.

(21) Appl. No.: 11/331,409

(22) Filed: Jan. 12, 2006

(65) Prior Publication Data

US 2006/0190490 A1    Aug. 24, 2006

Related U.S. Application Data

(60) Provisional application No. 60/643,445, filed on Jan. 12, 2005, provisional application No. 60/643,446, filed on Jan. 12, 2005.

(51) Int. Cl.
*G06F 17/30* (2006.01)
*G06Q 10/10* (2012.01)
*G06Q 30/02* (2012.01)

(52) U.S. Cl.
CPC .......... *G06F 17/30696* (2013.01); *G06Q 10/10* (2013.01); *G06Q 30/02* (2013.01)

(58) Field of Classification Search
USPC ............................................. 707/3, 748, 758
See application file for complete search history.

(56) References Cited

U.S. PATENT DOCUMENTS 5,692,181 A    11/1997  Anand et al.
6,038,560 A *   3/2000  Wical ................................. 707/5
6,311,169 B2   10/2001  Duhon
7,216,115 B1 *  5/2007  Walters et al. .................... 707/3
7,395,222 B1 *  7/2008  Sotos ........................... 705/7.34
7,523,045 B1 *  4/2009  Walker et al. .................... 705/8
2002/0010614 A1 *  1/2002  Arrowood ......................... 705/9
2002/0038233 A1 *  3/2002  Shubov et al. .................... 705/8
2002/0133374 A1 *  9/2002  Agoni et al. ...................... 705/2
2003/0046277 A1 *  3/2003  Jackson et al. .................... 707/3

(Continued)

FOREIGN PATENT DOCUMENTS

JP          2002-183356       6/2002
WO       WO-01/11559 A1       2/2001
WO    WO-2006/076450 A1       7/2006

OTHER PUBLICATIONS martindale.com, "Lawyer Locator Techincal Help" (http://web.archive.org/web/20000304122628/www.martindale.com/locator/tech_sup.html), Mar. 2000.*

(Continued)

*Primary Examiner* — Son T Hoang
(74) *Attorney, Agent, or Firm* — Norton Rose Fulbright US LLP

(57) ABSTRACT

The present inventors devised systems, methods, interfaces, and software that can facilitate identification of law firms and/or legal professionals. One exemplary system receives queries from users regarding a legal topic and responds with a listing of attorneys or law firms that are associated with information ranking them based on their experience in handling matters related to the legal topic. The ranking information is based on links between attorneys and public legal documents, such as judicial opinions, court dockets, briefs, litigation documents, journal articles, patents, trademarks, and so forth that mention them by name.

5 Claims, 8 Drawing Sheets

(56) References Cited

U.S. PATENT DOCUMENTS

| | | | |
|---|---|---|---|
| 2003/0084014 A1* | 5/2003 | Sohrabi et al. | 706/20 |
| 2003/0088556 A1* | 5/2003 | Allen, III | 707/3 |
| 2003/0158747 A1* | 8/2003 | Beton et al. | 705/1 |
| 2003/0195876 A1* | 10/2003 | Hughes et al. | 707/3 |
| 2004/0015329 A1* | 1/2004 | Shayegan et al. | 702/179 |
| 2004/0249968 A1* | 12/2004 | Srivstava | 707/10 |
| 2005/0149343 A1* | 7/2005 | Rhoads et al. | 707/3 |
| 2005/0165780 A1* | 7/2005 | Omega et al. | 707/7 |
| 2005/0234968 A1* | 10/2005 | Arumainayagam et al. | 707/102 |
| 2005/0278633 A1* | 12/2005 | Kemp | 715/713 |
| 2006/0004623 A1* | 1/2006 | Jasti | 705/10 |
| 2006/0026114 A1* | 2/2006 | Gregoire et al. | 707/1 |
| 2006/0047615 A1* | 3/2006 | Ravin et al. | 706/50 |
| 2006/0129593 A1* | 6/2006 | Slovak et al. | 707/102 |

OTHER PUBLICATIONS

"International Search Report for corresponding PCT Application No. PCT/US2006/001012", (Jun. 12, 2006), 3 pgs.

"U.S. Appl. No. 11/332,783, Non-Final Office Action mailed Jan. 7, 2008", OARN, 3 pgs.

"U.S. Appl. No. 11/332,783, Response filed Jul. 7, 2008 to Non Final Office Action mailed Jan. 7, 2008", 12 pgs.

U.S. Appl. No. 11/332,783, Response filed Aug. 3, 2009 to Advisory Action mailed Mar. 3, 2009, 16 pgs.

* cited by examiner

FIG. 5

SYSTEMS, METHODS, AND INTERFACES FOR AGGREGATING AND PROVIDING INFORMATION REGARDING LEGAL PROFESSIONALS

RELATED APPLICATIONS

The present application claim priority to U.S. Provisional Applications 60/643,445 and 60/643,336, which were both filed on Jan. 12, 2005 and which are both incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2004, Thomson Findlaw.

TECHNICAL FIELD

Various embodiments of the present invention concern information retrieval systems, particularly those that are tailored for particular industries, such as the legal industry.

BACKGROUND

A key aspect of the American legal system (as well as many others around the world) is its reliance on professional advocates, or lawyers, to facilitate adjudication or avoidance of legal disputes. Indeed, one of the constitutional rights that we as Americans cherish most dearly is the right to counsel. Thus, when confronted with a legal issue, one of the first questions that prudent businesses and individuals seek to answer is which attorney or law firm will assist them with expert legal advice and advocacy.

In recent years, many facing this question have sought to use the power of the Internet as a tool in identifying and/or selecting effective counsel for their legal needs. For example, many use general search engines, such as Google or Yahoo, to broadly search the World Wide Web for lawyers based on location and particular legal expertise. Others rely on legally focused resources, such as FindLaw which provides and maintains an extensive directory of law firms and legal professionals.

Although both generic and specific resources can be effective in identifying relevant lawyers, the present inventor has recognized there is considerable room for improvement. For example, the current resources lack any objective information regarding the experience of lawyers in specific legal specialties.

Accordingly, the present inventor has identified a need for better ways of searching for lawyers.

SUMMARY

To address these and/or other needs, the present inventor devised systems, methods, interfaces, and software that can facilitate identification of law firms and/or legal professionals. One exemplary system receives queries from users regarding a legal topic and responds with a listing of attorneys or law firms that are associated with information ranking them based on their experience in handling matters related to the legal topic. The ranking information is based on links between attorneys and public legal documents, such as judicial opinions, court dockets, briefs, litigation documents, journal articles, patents, trademarks, and so forth that mention them by name.

BRIEF DESCRIPTION OF DRAWINGS

FIG. 5 is a facsimile of an exemplary graphical user interface 500 which corresponds to one or more embodiments of the present invention.

DETAILED DESCRIPTION OF EXEMPLARY EMBODIMENT(S)

This description, which incorporates the Figures and the claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Information-retrieval System

Figure 1:
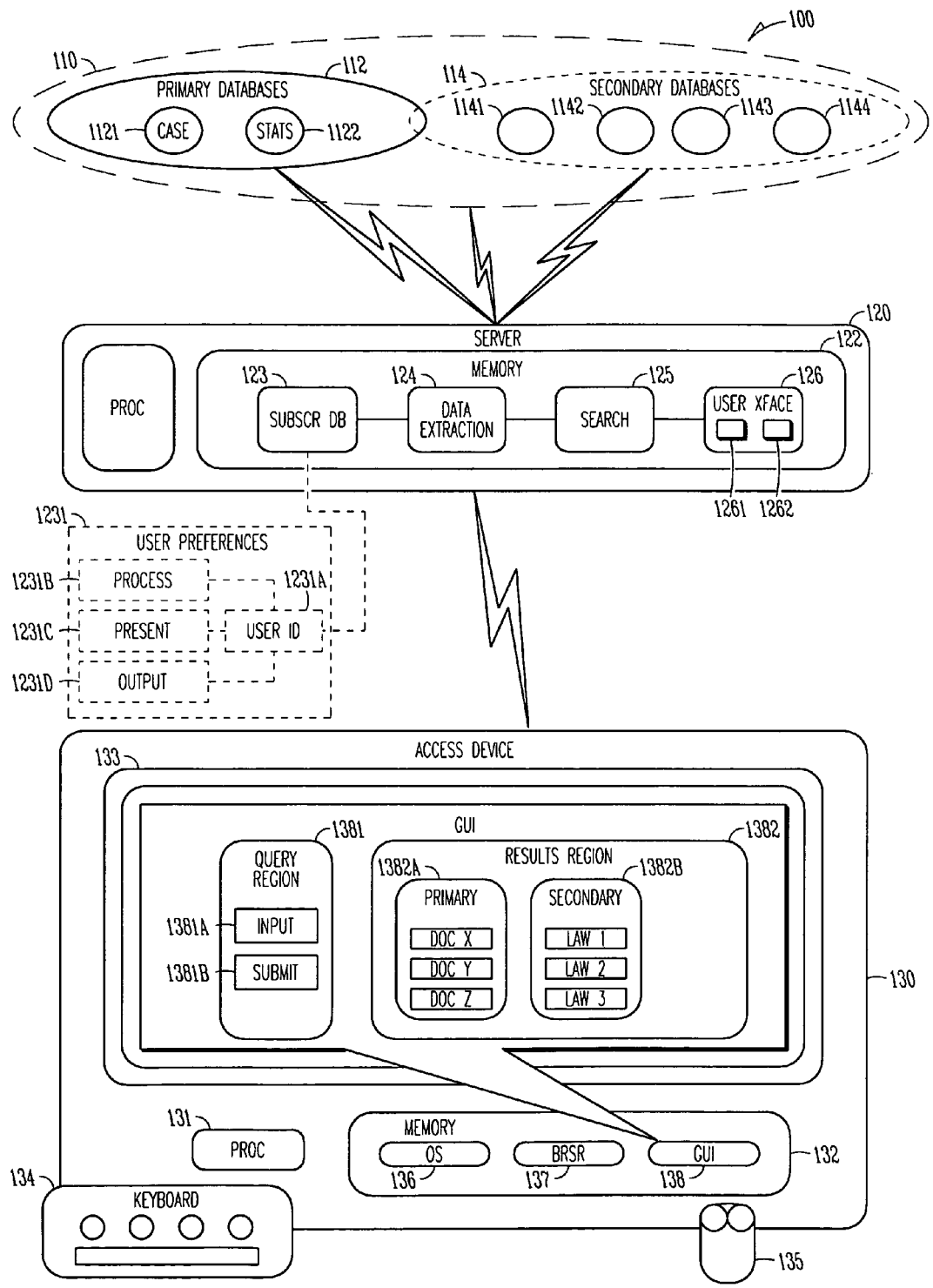
FIG. 1 is a block diagram of an exemplary information-retrieval system corresponding to one or more embodiments of the present invention.

FIG. 1 shows an exemplary online information-retrieval system 100, which incorporates teachings of the present invention. System 100 includes one or more databases 110, one or more servers 120, and one or more access devices 130.

Databases 110 include a set of primary databases 112 and a set of second databases 114. Primary databases 112, in the exemplary embodiment, include a case law database 1121 and a statutes database 1122, which respectively include judicial opinions and statutes from one or more local, state, federal, and/or international jurisdictions. Secondary databases 114 provide attorney, judge, law firm, product, and corporate profiles as well as briefs, pleadings. More specifically, one set of databases includes one or more of the following types of content: federal court dockets, mergers and acquisitions information, jury verdicts and settlements. Another set includes one or more of the following content types: patents, trademarks, copyrights, Security and Exchange Commission (SEC) filings; federal administrative decisions, Adminstrative Office of the Courts (AOC) federal court statistics, National Center for State Courts (NCSC) state court statistics, press releases, news reports, website content, state dockets, state attorney general opinions, state administrative decisions, corporate filing and registration; federal and state court briefs, federal and state pleadings and motions, law reviews, bar journals, and continuing legal education (CLE) materials.

Each corporate profile include one or more industry classification codes or indicators as well as associations to lawyer and law firm names derived from matching their names to those in documents containing references to both the corporate entity and the lawyer or law firm. In some embodiments, the case law documents are logically associated via a data structure with documents or profiles in databases 114. Additionally, attorney or law firm profiles are associated with data structures that provide experiential ratings for the attorneys in various legal and/or jurisdictional categories of law.

The tallies may be made by counting the number of times a given attorney's name or a given law firm's name appears in court documents that pertain to a given legal specialty, such as intellectual property law, employment law, or tax. Association of documents with legal specialties or topics is based on a legal categorization system such the Key Search System, which is featured in the Westlaw Online Research System. Other embodiments also tally journal articles identifying a given attorney as an author. In some cases, the tally of cases or articles or other documents can be deemphasized based on the age of the cases or articles, so that more recent experience can be weighted more heavily than past experience in determining an experiential rating. (In some embodiments, alternative or supplemental experiential ratings can be determined in real-time based on user specified criteria taken alone or in conjunction with previously generated experiential data and statistics derived from case law and other types of documents in the databases.) Other embodiments may include non-legal databases that include financial, scientific, or health-care information.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a data-extraction module 124, a search module 125, and a user-interface module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, data-extraction module 124, search module 125, and user-interface module 126.

Subscriber database 123 includes subscriber-related data for controlling, administering, and managing pay-as-you-go or subscription-based access of databases 110. In the exemplary embodiment, subscriber database 123 includes one or more preference data structures, of which data structure 1231 is representative. Data structure 1221 includes a customer or user identifier portion 1231A, which is logically associated with one or more report generation or presentation preferences, such as preferences 1231B, 1231C, and 1231D. Preference 1231B includes a default value governing whether one of more of the functions described herein is enabled or disabled. Preference 1231C includes a default value governing presentation of interfaces related to the one or more functions. Preference 1231D includes a default value governing other aspects of the one or more functions. (In the absence of a temporary user override, for example, an override, during a particular query or session, the default value for trend reporting.)

Data-extraction module 124 includes one or more sets of machine-executable instructions for extracting attorney identification data, court and court date information, attorney plaintiff-defendant status information, client identification data, client industry identification data, client plaintiff-defendant status information, attorney-to-client identification data, and law-firm identification data from documents in databases 110.

In some embodiments, data-extraction module 124 produces a secondary index or other form of data structures which logically associates or relates documents and/or specific data contained in those documents to specific lawyers and/or law firms. In some embodiments, data-extraction module 124 includes separates sets of parsers and extractors tailored for various types of documents in database 110. Additionally, some embodiments employ simple text matching of lawyer and law firm names in attorney and law firm profiles or in corporate profiles to documents that are classified according to a legal subject matter hierarchy, such as the Key Search system, whereas others employ complex Bayesian matching or other intelligent techniques for inferring such data connections.

The Key Search system provides the following top level of legal categories: Administrative Law, Agriculture, Alternative Dispute Resolution (ADR), Antitrust and Trade Regulation, Art, Entertainment, and Sports Law, Bankruptcy, Business Organizations, Civil Procedure, Civil Remedies, Civil Rights, Commercial Law and Contracts, Communications, Conflict of Laws, Constitutional Law, Construction Law, Criminal Justice, Education, Elections and Politics, Employment Law, Energy and Utilities, Environmental Law, Family Law, Finance and Banking, Government, Health Immigration Law, Indigenous Peoples, Insurance, Intellectual Property, International Law, Juvenile Justice, Legal Services, Maritime Law, Military Law, Products Liability, Professional Malpractice, Property—Personal, Property—Real, Science, Computers, and Technology, Securities Law, Taxation—Federal, Taxation—State and Local, Torts/ Personal Injury, Transportation, Veterans, Wills, Trusts, and Estate Planning.

In some embodiments, data extraction module 124 includes web-based applications to semantically connect or link legal practitioners' customers (current or prospective) to detailed information related to the attorney's experience, relevancy (to the legal issue at hand), and context (of the customer). In addition, some embodiments enable attorneys and their customers to automatically generate reporting data to determine attorneys' and/or firms' success records, law-firm trends and history in various legal specialties, and customer (client) trends and histories with attorneys and firms who have represented them. Also, this legal-practitioner data can form "visual relationships" of attorneys with cases, judges, other attorneys, clients, publications, etc. The exemplary technology provides a comprehensive solution to tracking information on legal practitioners in the contexts of legal relevance and contextual relationships, reports, and visual relationships. While some embodiments of the present invention have this capability (for example by suggesting legal subject matter experts or related published materials in response to case law or legal literature queries) others, potentially more significant, provide data based on documented relationships that have been experienced between attorneys, firms, judges, and clients to produce legitimate related references.

Search module 125 includes one or more search engines for receiving and processing user queries against one or more of databases 110. In the exemplary embodiment, one or more search engines associated with search module 124 enable users to search for attorneys or law firms with demonstrated experience in a given legal issue and/or given court/judge. Attorneys and law firms are sorted by relevance, with the most experienced in a given legal issue and/or court displayed first based on experiential ranking information. This module (in cooperation with others) also enables users to find legal representation through contextual relationships on related web pages. For example, if a user is viewing a page with content related to intellectual property, the system recommends attorneys who are local (and potentially national) experts in intellectual property. Some embodiments are sensitive to whether the legal context is a local, state, or federal issue, limiting or even expanding recommendations accordingly. For example, patent law is generally a federal issue, so that attorney or firm locality may often be of lesser significance. Results can be expanded and ordered accordingly.

User-interface module 126 includes machine readable and/or executable instruction sets for wholly or partly defining web-based user interfaces, such as search interface 1261 and results interface 1262, over a wireless or wireline communications network on one or more accesses devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 13 lone or more processors (or processing circuits) 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer browser. (However, some embodiments use other operating systems and browsers.) Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120 to implement the interfaces shown above or elsewhere in this description.)

More specifically, GUI 138 includes a query region 1381 and a results region 1382. Query region 1381 includes an input feature 1381A and a submit feature 1381B. Input feature provides one or more input regions, such as a lawyer-law-firm selection feature, a geographic (or jurisdictional) selection feature, and a legal subject matter feature.

In the exemplary embodiment, each of these control features takes the form of a hyperlink or other browser-compatible command input, and provides access to and control of query region 1381 and search-results region 1382. User selection of the control features in region 1382 results in retrieval and display of at least a portion of the corresponding document within a region of interface 138 (not shown in this figure.) Although FIG. 1 shows region 1381 and 1382 as being simultaneously displayed, some embodiments present them at separate times.

Figure 2:
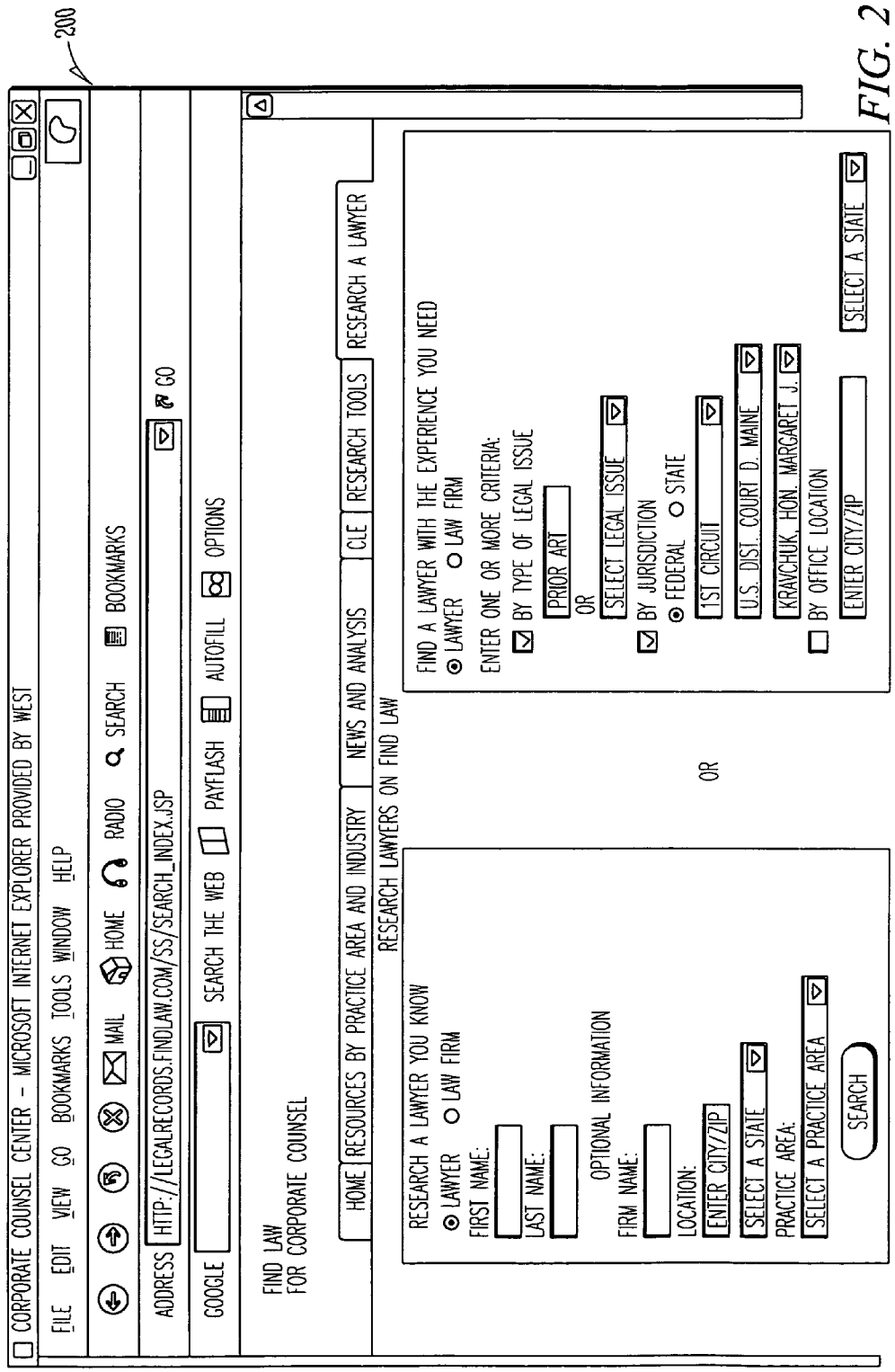
FIG. 2 is a facsimile of an exemplary graphical user interface 200 which corresponds to one or more embodiments of the present invention.
Figure 3:
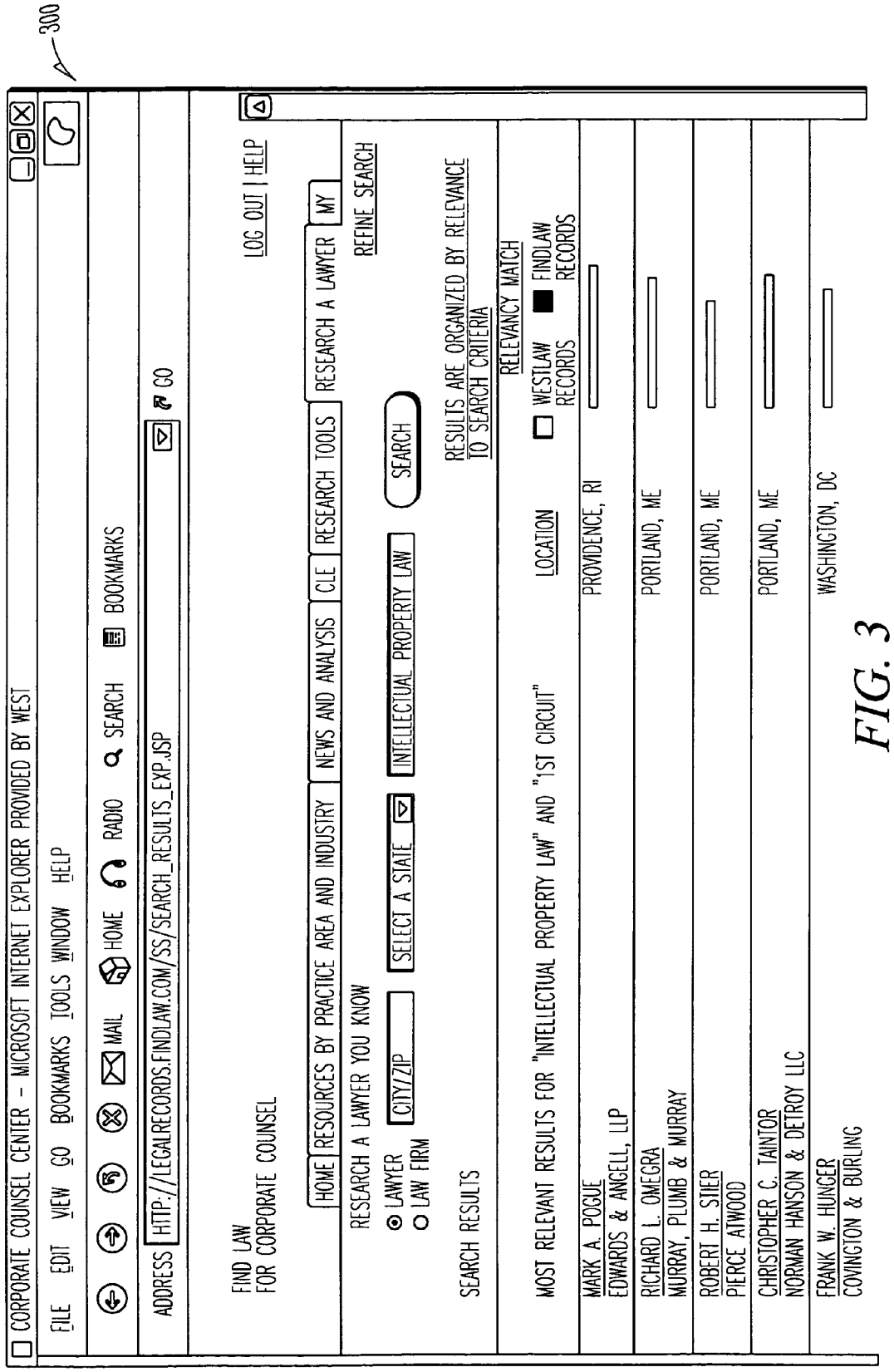
FIG. 3 is a facsimile of an exemplary graphical user interface 300 which corresponds to one or more embodiments of the present invention.
Figure 4:
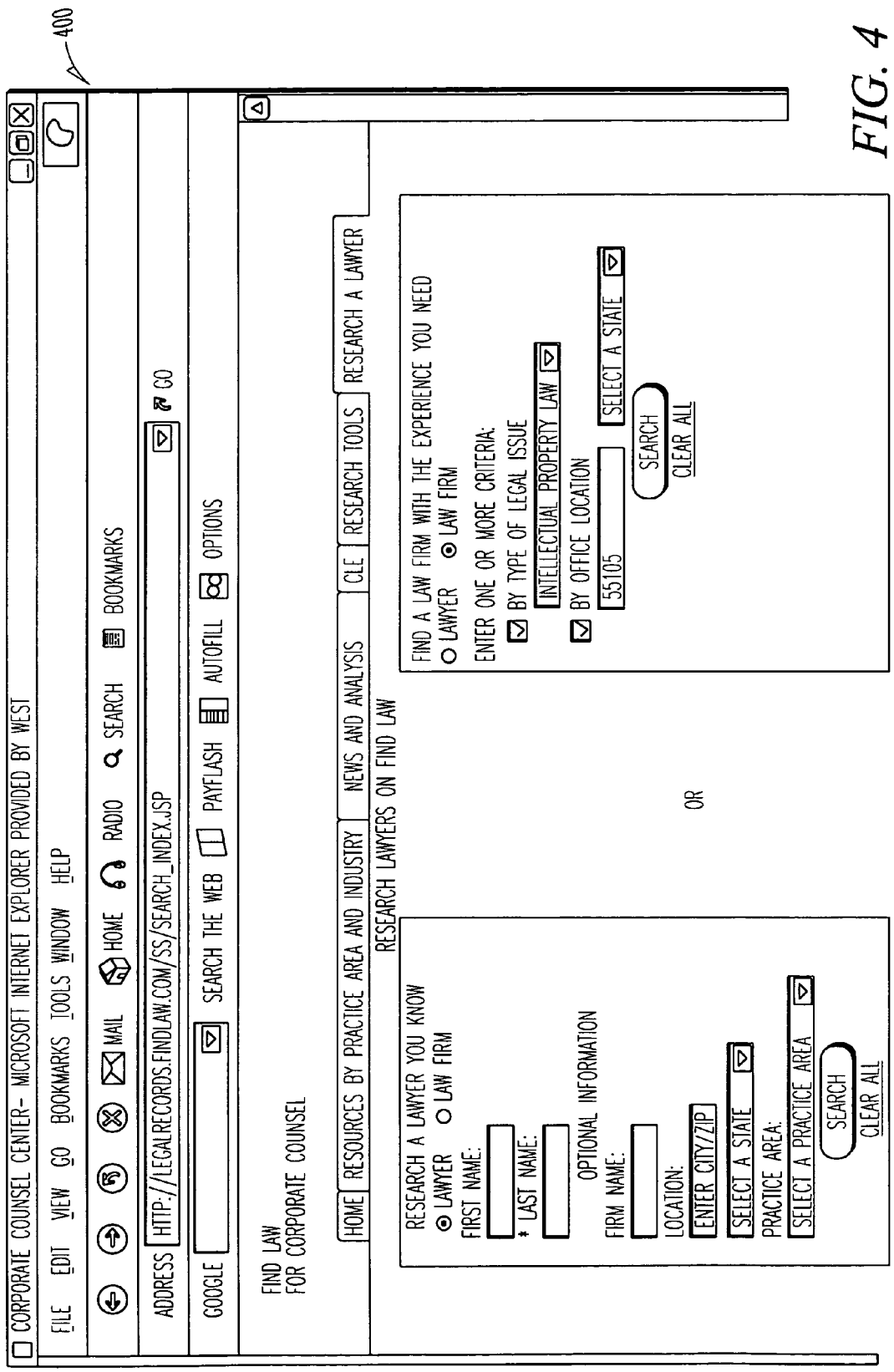
FIG. 4 is a facsimile of an exemplary graphical user interface 400 which corresponds to one or more embodiments of the present invention.
Figure 5:
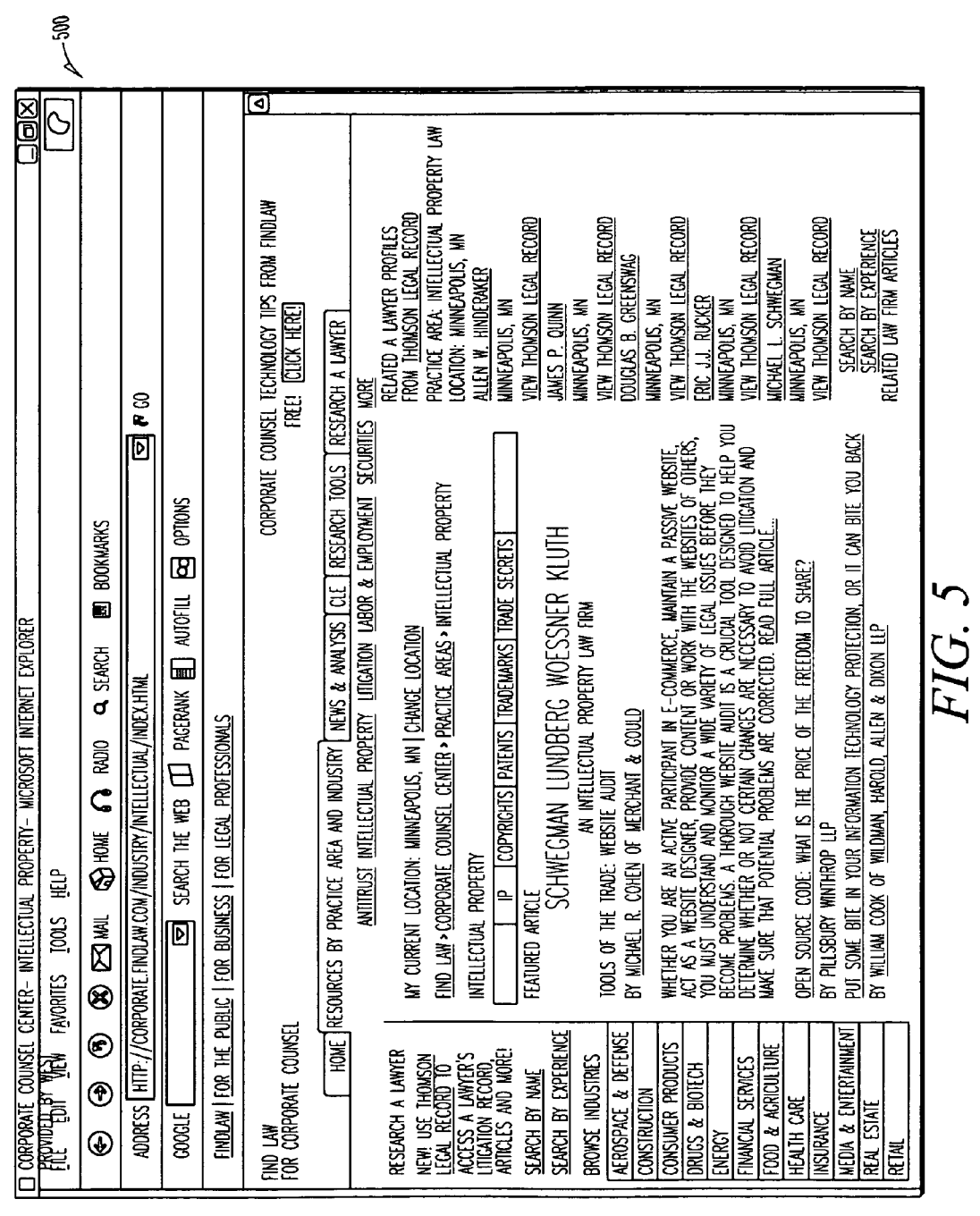

FIGS. 2-6 respectively show other exemplary interfaces 200, 300, 400, 500, and 600 that have one or more portions that may be used in place of one or more portions of GUI 138. In FIG. 2, interface 200 displays an attorney query for experts in a legal field of prior art who have tried cases under Margaret Kravchuk in Maine's First Circuit U.S. District Court. Interface 300 displays the resulting list of attorneys from the query according to their relevant litigation experience and authorship. In FIG. 4, interface 400 displays a query on intellectual-property law to be searched by law firm. In FIG. 5, interface 500 displays a list of related attorney profiles within the context of a featured article. The attorney links listed on the right portion of the screen identify attorneys with legal expertise in the field that is featured in the article. The links, in some embodiments, are listed in rank order of experience, with the most experienced lawyer listed first.

Figure 6:
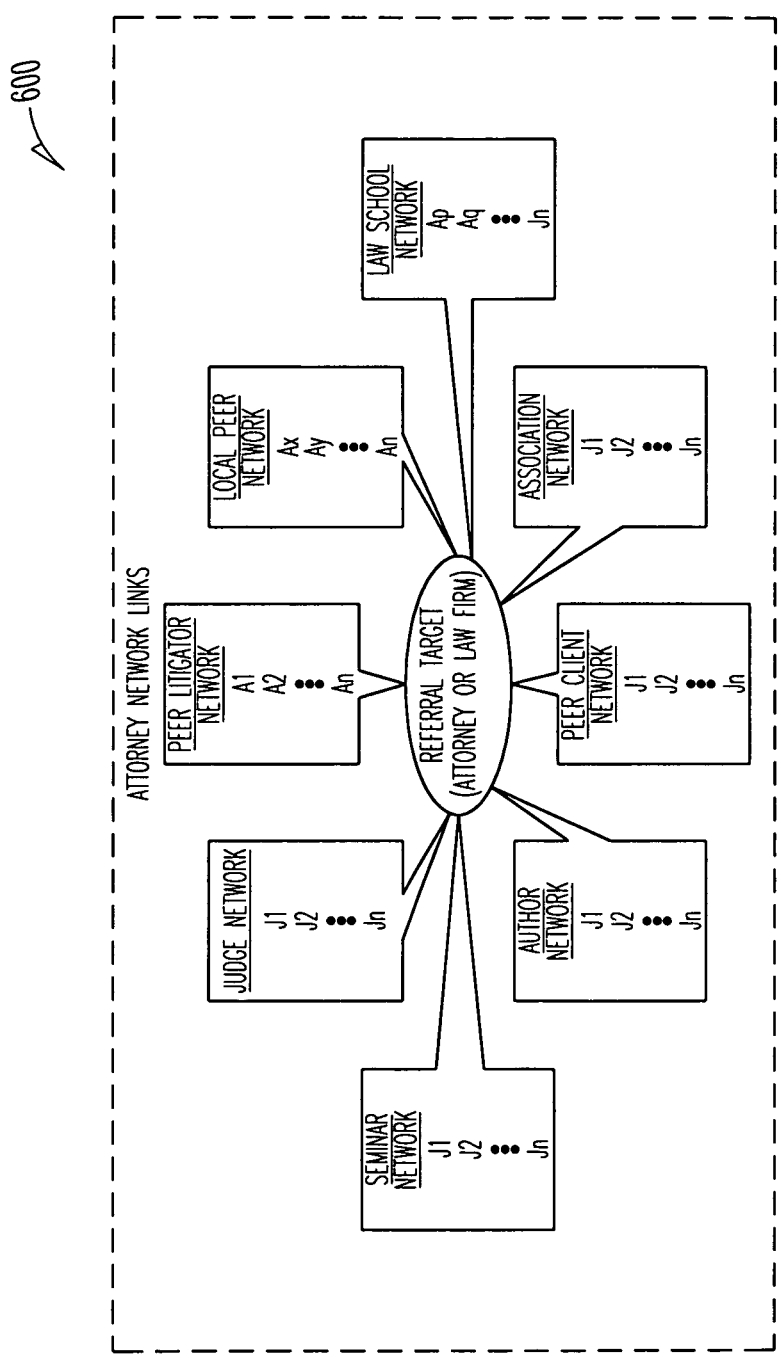
FIG. 6 is a facsimile of an exemplary graphical user interface 600 which also corresponds to one or more embodiments of the present invention.

In FIG. 6, interface 600 displays a visual relationship network for a given attorney, which in some embodiments may be a referral target or prospective lateral hire. The visual relationship network allows legal practitioners to facilitate referrals and to build an online "community" that provides associations with a variety of networks. Previous relationship-network applications only contain aggregate attorney attributes that form a limited universe of attorney information. Some embodiments use this figure as a template for a networking interface, in which a user selectively activates each cluster or family of nodes to initiate display of screens that show details, such as contact and profile information, including professional experience and third-party ratings, of people identified within the cluster. The judge network includes attorney appearances associated with judges, courts, legal matters, etc. The local peer network displays other attorneys who have appeared in front of the same judge, in the same courts, or on the same legal matters. Additional sub-networks provide information related to their titles.

Thus, various embodiments provide users the capability to search for expertise on specific legal matters, in specific courts, before specific judges. In addition, this feature allows firms to make hiring decisions by providing a view of an attorney's litigation record that is drawn from court decisions in a proprietary online legal research service. Profiles also display a full view of a legal practitioner's litigation experience to assist in these hiring decisions. This history can also be useful in assessing potential conflicts of interest for given attorneys.

Exemplary Methods of Operating an
Information-retrieval System

Figure 7:
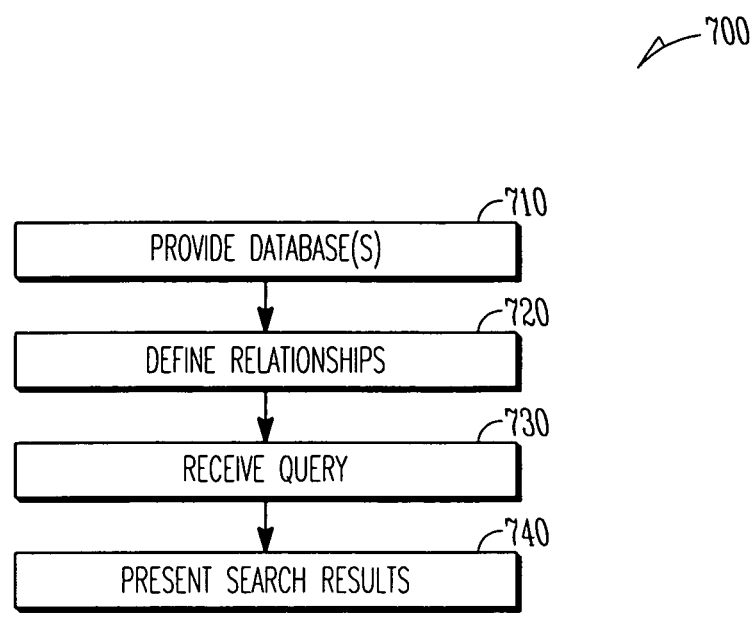
FIG. 7 is flow chart of an exemplary method corresponding to one or more embodiments of the present invention.

FIG. 7 shows a flow chart 700 of an exemplary method of operating an information retrieval system, such as system 100 in FIG. 1. Flow chart 700 includes blocks 710-740, which are arranged and described serially. However, other embodiments execute two or more blocks in parallel using multiple processors or processor-like devices or a single processor organized as two or more virtual machines or sub processors. Other embodiments also alter the process sequence or provide different functional partitions or blocks to achieve analogous results. Moreover, still other embodiments implement the blocks as two or more interconnected hardware modules with related control and data signals communicated between and through the modules. Thus, the exemplary process flow applies to software, hardware, and firmware implementations.

At block 710, the exemplary method begins with provision of a multilingual document collection—that is a collection comprising two or more documents written in two or more languages. In the exemplary embodiment, the document collection takes the form of one or more databases, such as database 110 in FIG. 1. Execution continues at block 720.

Block 720 entails defining or extracting relationships between documents in the databases. In the exemplary embodiment, this entails using data-extraction module 124 in system 100 to extract entity names from the documents and using various techniques to identify or infer relationships between the extracted names. After the one or more indices are defined, processing continues at block 730.

Block 730 entails receiving a query from a user. In the exemplary embodiment, this entails a user directing a browser in a client access device, such as device 130 in FIG. 1, to an internet-protocol (IP) address for an online information-retrieval system, such as system 100, and then logging onto the system using appropriate credentials. Successful login results in a web-based search interface, such as interface 138 in FIG. 1 (or one or more portions thereof) being output from server 120, stored in memory 132, and displayed by client access device 130. The user then defines the query by interacting with the interface, specifically entering data into one or more query fields or selecting from various drop-down menus. feature to transmit the query to a server, such as server 120 for processing. Execution then advances to block 740 (as shown in FIG. 7.)

Block 740 entails presenting a graphical user interface listing the identified set of documents in groups based on corresponding language and/or in rank order of relevance. In the exemplary embodiment, this entails displaying a listing of the identified set of items, such as attorneys or documents and attorneys on interface 138, 200, 300, 400, or 500. In some embodiments, selection of a link associated with a listed attorney causes retrieval of a profile for the attorney, with the profile including a link to cause display of an interface, such as interface 600, which shows various networks that the respective attorney belongs to. In some variations of these embodiments, an additional charge is levied against the subscriber upon accessing interface 600 and the value-added information it provides.

Figure 8:
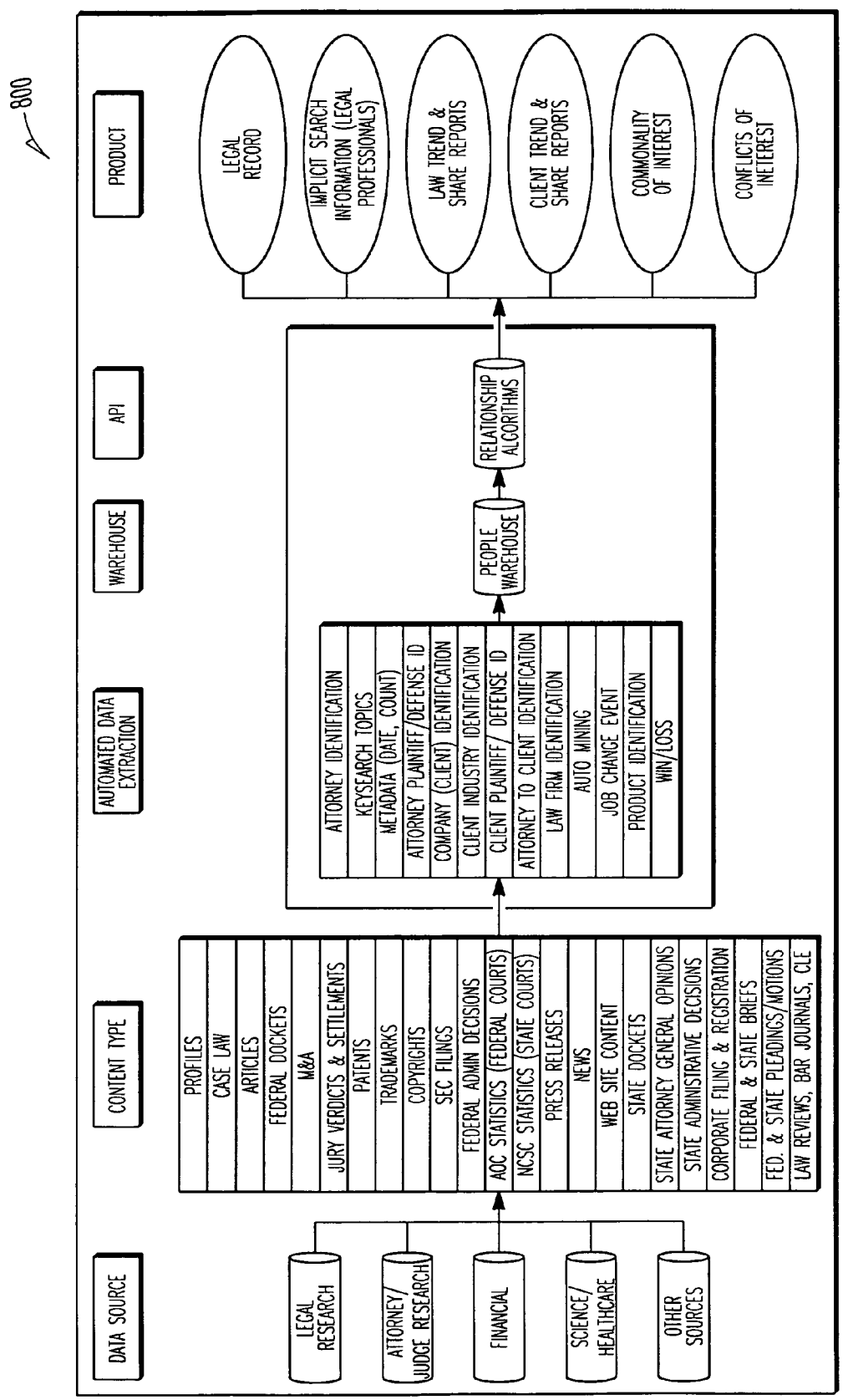
FIG. 8 is a block diagram of an exemplary method corresponding to one or more embodiments of the present invention.

FIG. 8 shows a high-level flow diagram that may be employed at block 720 or within data extraction module 124. The diagram includes workflow and supporting components. Data sources (in the first column) from various proprietary repositories contain a variety of content types. In this diagram, the content types include articles, law reviews, mergers and acquisitions (M&A), and political contributions. The data-extraction colunm displays the programs that extract data from the content according to the functions/products the data will support. For example, the law-trend and client-trend report applications require data to be extracted by identifying the company, attorney-to-client relationship, and law-firm. In addition, auto-mining and "job change event" extraction may be used. Auto-mining is essentially the process by which an attorney is added to the content repository if he or she is not identified by the extraction program. "Job change event" extraction monitors press releases for updates to an attorney's position within his or her existing firm or another firm. Once the data is extracted by the mining programs according to function, it is placed in a "relationship authority," or relational data structure, such as an index or added as meta data to attorney and corporate profiles. An inference engine (not shown) then processes data from the relationship algorithm into final products. This engine is built with a series of algorithms (rules) that infer the relationships of attorneys, employment information, corporate legal data, etc. For example, if Attorney A has appeared before Judge A during the same case as Attorney B, the inference rules within the engine would determine that Attorneys A and B were involved in the same case.

CONCLUSION

The embodiments described above and in the claims are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

The invention claimed is:

1. An information retrieval system comprising:
a database comprising information regarding a plurality of lawyers, and a plurality of electronic files,
wherein information for each of the plurality of lawyers includes a name and is associated with at least one legal experience indicator, the at least one legal experience indicator being based at least in part on:
a count of a number of electronic files in the database that include the name of a respective lawyer,
a date associated with each of the plurality of electronic files that includes the name of the respective lawyer,
a level of experience of the respective lawyer with at least one of a given court and a given judge, and
a legal context comprising at least one of a local issue, a state issue, and a federal issue, wherein the legal context is associated with a jurisdiction or a geographic factor; and
a server implemented at least partially by hardware including at least one processor and memory, the server configured to receive a user query regarding a legal issue from at least one client access device and to output to the client access device a list of two or more lawyer names contained in the database corresponding to the legal issue,
wherein the server is configured to:
associate the user query with a corresponding legal context, wherein the corresponding legal context is associated with a jurisdiction or a geographic factor,
automatically count the number of electronic files in the database that include the name of the respective lawyer, wherein the count of the number of electronic files is deemphasized based on an age associated with each of the electronic files so that more recent experience is weighted more heavily than past experience,
determine the date associated with each electronic file,
calculate the at least one legal experience indicator for each of the two or more lawyer names,
rank the two or more lawyer names in the list according to the calculated at least one legal experience indicator associated with each of the two or more lawyer names and according to the corresponding legal context associated with the user query, and wherein the server is configured to output the list of two or more lawyer names as part of a graphical user interface for display on a display screen of the client access device, and wherein the server is configured to respond to user selection of one of the listed two or more lawyer names and display a listing of one or more other lawyer names professionally associated with the selected lawyer name.

2. The information retrieval system of claim 1, wherein the list of the two or more lawyer names includes each of the lawyer names associated with a hyperlink for causing display of a profile for a corresponding lawyer name.

3. An information retrieval system comprising:
   at least one processor and memory implemented at least partially by hardware;
   a first set of data sources including one or more of the following: a case law database and a statutes database; and
   a second set of data sources including attorney profiles and one or more of the following types of content: court proceedings, government documents, news reports, corporate documents, and legal publications,
   wherein the at least one processor and memory is configured by the information retrieval system for:
      extracting attorney information from the first and second sets of data sources,
      automatically associating a portion of the extracted attorney information regarding a specific attorney with a corresponding profile of the specific attorney found in the second set of data sources,
      calculating a legal experience indicator for the specific attorney based on the extracted attorney information regarding the specific attorney, and
      associating the legal experience indicator with a legal context including at least one of a local issue, a state issue, and a federal issue, wherein the legal context is associated with a jurisdictional or geographic factor, and
      wherein the legal experience indicator is calculated based at least in part on
         a count of a number of electronic files in the first and second sets of data sources that include the specific attorney, wherein the count of the number of electronic files is deemphasized based on an age associated with each of the electronic files so that more recent experience is weighted more heavily than past experience,
         a date associated with each of the electronic files that includes the specific attorney, and
         a level of experience of the specific attorney with at least one of a given court and a given judge.

4. The information retrieval system of claim 3, wherein the second set of data sources includes at least one of the following types of content: federal court dockets, mergers and acquisition documents, jury verdicts and settlements, court proceeding documents, patents, trademark registrations, copyright registrations, U.S. Securities and Exchange Commission filings, federal administrative decisions, federal court statistics, state court statistics, press releases, web site content, state dockets, state attorney general opinions, state administrative decisions, corporate filings and registrations, federal and state court briefs, federal and state pleadings and motions, law review articles, bar journals, and continuing legal education information.

5. An information retrieval system comprising:
   a database comprising information regarding a plurality of lawyers, and a plurality of electronic files,
   wherein information for each of the plurality of lawyers includes a name and is associated with at least one legal experience indicator, the at least one legal experience indicator based at least in part on:
      a count of a number of electronic files in the database that include the name of a respective lawyer,
      a level of experience of the respective lawyer with at least one of a given court and a given judge, and
      a legal context comprising at least one of a local issue, a state issue, and a federal issue, wherein the legal context is associated with a jurisdiction or geographic factor; and
   a server implemented at least partially by hardware including at least one processor and memory, the server configured to receive a user query regarding a legal issue from at least one client access device and to output to the client access device a list of two or more lawyer names contained in the database corresponding to the legal issue,
   wherein the server is configured to:
      associate the user query with a corresponding legal context, wherein the corresponding legal context is associated with a jurisdiction or a geographic factor,
      automatically count the number of electronic files in the database that include the name of the respective lawyer to calculate the legal experience indicator for each of the two or more lawyer names, wherein the count of the number of electronic files is deemphasized based on an age associated with each of the electronic files so that more recent experience is weighted more heavily than past experience,
      rank the two or more lawyer names according to the legal experience indicator associated with each of the two or more lawyer names and according to the corresponding legal context associated with the user query, and
   wherein the server is further configured to identify professional relationships between the two or more lawyer names that appear on the list.

* * * * *